United States Patent [19]

Posega, Jr.

[11] 4,123,905
[45] Nov. 7, 1978

[54] TORQUE CONVERTER ASSEMBLY

[75] Inventor: Paul Posega, Jr., Rockford, Ill.

[73] Assignee: Borg-Warner Corporation, Chicago, Ill.

[21] Appl. No.: 801,140

[22] Filed: May 27, 1977

[51] Int. Cl.² .............................................. F16D 33/00
[52] U.S. Cl. ................................ 60/361; 29/156.8 FC
[58] Field of Search ......................... 60/361, 345, 327; 29/156.8 FC

[56] References Cited

U.S. PATENT DOCUMENTS

| | | | |
|---|---|---|---|
| 2,858,675 | 1/1968 | Schneider | 60/345 |
| 3,320,747 | 5/1967 | Denes | 60/361 |
| 3,330,111 | 7/1967 | Denes | 60/361 |
| 3,360,935 | 1/1968 | Schneider | 60/361 |

*Primary Examiner*—Edgar W. Geoghegan
*Attorney, Agent, or Firm*—Robert L. Zieg

[57] ABSTRACT

A high torque ratio hydraulic torque converter having impeller, turbine and stator elements in which the stator is assembled to the housing of the converter and secured in place by drilling and driving of locking pins and in which a flow path is defined within the converter by means of an annular sheet metal guide ring. The guide ring is secured in place by means of drilling and driving a locking pin at the outer annular edge of the guide ring, the guide ring being in contact with the sealing member in the housing to define fluid entry and fluid exit chambers for the hydraulic converter between the guide ring and the fixed housing. Further, the turbine member includes a steel hub which is cast within the center of the turbine having means to provide for translation of force in both rotary and axial directions between the cast material and the steel hub.

16 Claims, 4 Drawing Figures

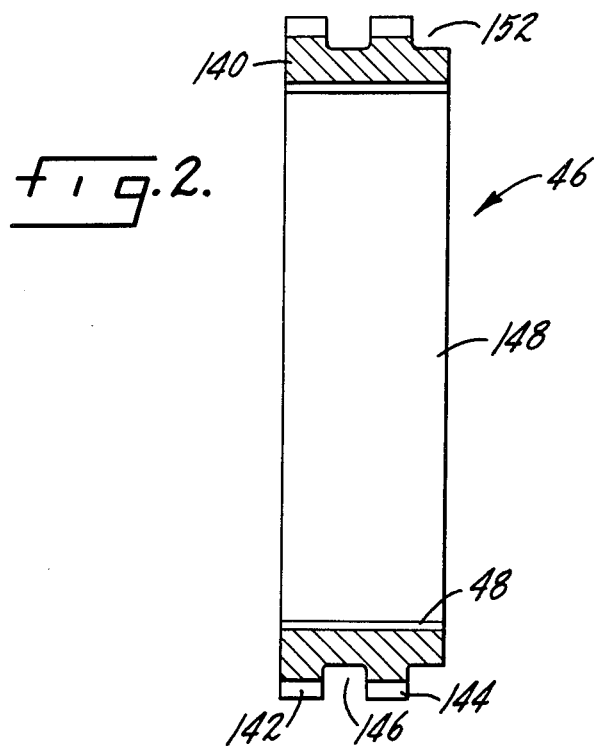
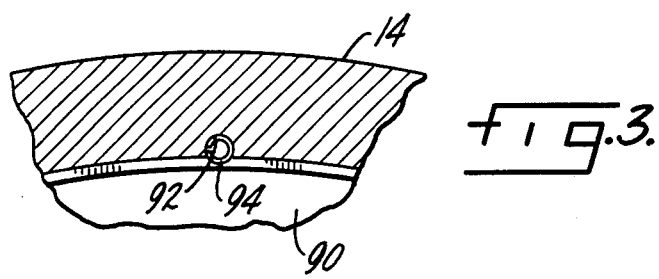
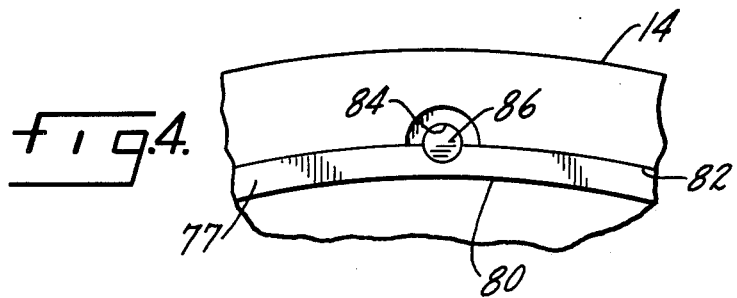

TORQUE CONVERTER ASSEMBLY

BACKGROUND OF THE INVENTION

1. Field of the Invention

This application relates to the field of hydraulic torque converter mechanisms within the generic field of hydrodynamic devices and more particularly, to those having a high torque ratio.

2. Prior Art

It is know in the prior art to provide for hydraulic torque converters having a high torque ratio. More particularly, U.S. Pat. Nos. 3,320,747 and 3,330,111, of common assignee, show hydraulic torque converter mechanisms having high torque ratios and employing stator, turbine and impeller elements. Further U.S. Pat. No. 3,330,111 shows a device in which the flow path through the stator is in a direction parallel to the axis of rotation of the mechanism. It has been recognized in hydraulic converters of the type herein described that the provision of an efficient flow path is best provided by utilization of a guide member to be mounted within a fixed housing. A problem with such structures is to find a simple and reliable method by which the guide members can be mounted within the fixed housing and further as how to best combine the assembly with the bladed stator member which also must be fixed to the housing. Further the problem exists wherein cast aluminum bladed elements are being used in a converter and the driving hubs of such members are required to have high strength and wear characteristics to translate driving force.

SUMMARY OF THE INVENTION

The present invention achieves the above stated desirable objects, first of all, by providing a guide ring to partly define the fluid path and which is secured in place merely by use of a locking pin mechanism at the outer annular edge of the guide and at the same time, the ring engages a sealing member in the fixed housing for the converter to define fluid entry and exit chambers for the hydraulic converter. In addition, the stator member is assembled within the fixed housing after the guide ring is so assembled, and secured in the housing by drilling a hole which extends through both the outer annular edge of the stator and the housing and driving pins in the holes. This provides for restraint of the guide ring and the stator in a rotational sense. When the two housing halves are secured together, since the stator member engages an edge of the guide ring, and the rear housing half engages the stator member, once the housing halves are assembled the structure is secured together in the axial direction. Further the problem of providing strength and wear characteristics for the hub of the turbine member, which is the output member of the torque converter, is provided by casting the turbine around a steel hub which has means to provide a force transmitting relationship between the cast member and the steel hub in both an axial and a rotational sense.

BRIEF DESCRIPTION OF THE DRAWINGS

FIG. 2 is a sectional view through the steel hub member for the turbine of the hydraulic converter;

FIG. 3 is a sectional view taken along the lines 3—3 of FIG. 1; and

FIG. 4 is a sectional view taken along the lines 4—4 of FIG. 1.

DETAILED DESCRIPTION OF THE EMBODIMENT

Figure 1:
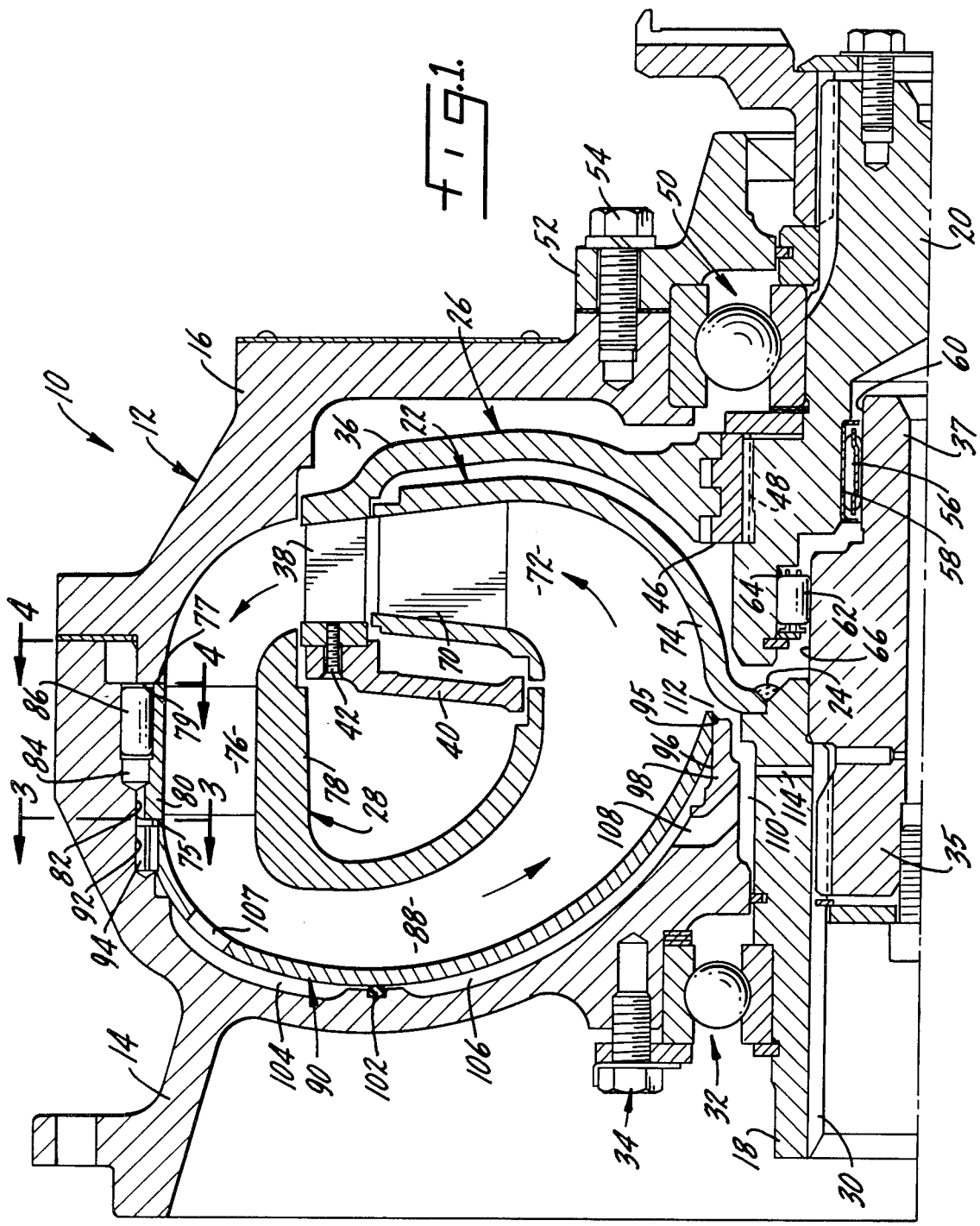
FIG. 1 is a cross sectional view through a hydraulic torque converter embodying the principles of the present invention.

Referring to FIG. 1, there is illustrated an improved hydraulic torque converter mechanism 10 having the following main components: a housing 12 composed of front housing half 14 and a rear housing half 16 which may be bolted together, for example, to form a stationary assembly; an imput shaft 18; an output shaft 20; an impeller element 22 connected to be driven by input shaft 18, as for example, by joining the turbine to the input shaft by welding as illustrated at 24; a rotary turbine member 26; and a stationary stator member 28.

The input shaft 18 is hollow and has internal splines 30 thereon, suitable for driving connection with an engine driven shaft. Input shaft 18 is rotatably mounted within housing 12 by a ball bearing assembly 32 which is secured within housing half 14 by a bolt assembly 34. Also connected to splines 30 is a support shaft 35 which has a nose portion 37.

The rotary turbine member 26 is comprised of an output driving flange 36, which may be formed of aluminum and has cast therewith, a series of turbine blades 38. Secured to the driving output flange 36 is an inner guide ring 40 which is secured thereto by screws 42, for example. The turbine member 26 is a rotating assembly adapted to be driven by fluid activated by impeller 22, as will be described. Also assembled to driving flange 36 is an integral splined drive hub 46 which is manufactured of steel and is more particularly illustrated in FIG. 2, as will be described later. Member 46 has splines 48 which spline to output shaft 20, such that the output shaft 20 can be driven by turbine member 26. A ball bearing assembly 50 is secured within the rear housing half 16 by a retaining cover 52, which is secured thereto by bolts 54, for example. The ball bearing 50 mounts the output shaft 20 for rotation. A bearing 56 which may be a roller bearing is mounted between internal bore 58 of output shaft 20 and a surface 60 on nose portion 37 of shaft 35. Thus, input shaft 18 is mounted for relative rotational movement with respect to output shaft 20, but is supported by the output shaft 20.

In addition, a one-way clutch 62, which may be of the roller or sprag type, is mounted between the input and output shafts, engaging between a race 64 provided internally of the shaft 20 and a surface 66 provided on shaft 35. The purpose of the one-way clutch is to provide for and allow rotation of the input shaft 18 with respect to output shaft 20 so long as the rotational speed of input shaft 18 exceeds the speed of output shaft 20. When the output shaft 20 attempts to overspeed input shaft 18 in the same direction, a direct connection is made between output shaft 20 and input shaft 18 through one-way clutch 62 to prevent such overspeeding of the output shaft 20 and turbine 26, whereby engine braking is provided at all times through the torque converter 10.

The impeller unit 22 is of a fabricated construction having a plurality of blades 70 posed in a circular flow path 72 within the impeller. Impeller 22 has integral therewith a driving flange 74 which is welded to input shaft 18 to be driven thereby.

Stator member 28 includes a plurality of blades 76 which are adapted to receive the fluid flow coming out of the impeller element in a hydraulic torque converter. The stator is also of a cast construction having an inner cup-shaped annular ring 78 and an outer annular ring 80.

The stator member 28 is secured in the stationary housing half 14 in a unique manner. The outer annular ring 80 fits closely within an inner bore 82 in the housing 14 as illustrated in FIGS. 1 and 4. After the stator is assembled in the housing, a series of three holes 84 are drilled equally placed around the circumference of the stator 28, as best illustrated in FIG. 4. In each of the holes 84 a locking means or dowel pin 86 is driven, the dowel pin being slightly larger than the hole, and thus providing a secure mounting of stator 28 within housing half 14 in the rotational sense.

To the left of stator blades 76, as viewed in FIG. 1, is a flow passage 88 which serves to bend the fluid path from its axial direction as it leaves the stator blades 76 in a toroidal path to the entrance of impeller blades 70. The flow path 88 is defined between the annular ring 78 and an annular guide ring 90.

As illustrated in FIGS. 1 and 3, guide ring 90 is so shaped so that the flow path 88 diverges as it approaches the entrance to impeller blades at 70 to provide maximum flow area in path 88 and add efficiency to the torque converter. Guide ring 90 is mounted within stationary housing half 14 in a unique manner in that at least one hole 92 is provided by drilling same after assembly of ring 90 in the housing half 14. As illustrated in FIG. 3, the hole 92 after drilling is comprised of a notch in housing half 14 and a notch in guide ring 90. The hole 92 may have the same location as one hole 84, although hole 84 is drilled later after stator 28 is assembled in housing half 14. A roll pin 94 which may be called a spring pin, being a hollow split pin as is known in the art, is driven into hole 92 and in engagement with the outer annular edge of the guide 90 to secure the guide 90 in position. As seen in FIG. 1, the guide 90 has an inner annular surface 95 which closely fits an annular surface 96 provided on a hub 98 formed internally of housing half 14. The assembly method using roll pin 94 tightly holds guide ring 90 in position in a rotational sense and against an "O" ring 102 mounted in housing 14 at a mid-point in the radial extent of guide ring 90. The "O" ring 102 thus defines two separate fluid chambers between guide ring 90 and housing half 14. An outer chamber 104 and an inner chamber 106 are thus provided.

As illustrated in FIG. 1 stator 28 has a radial surface 75 which engages guide ring 90 and a radial surface 77 which is engaged by a mating surface 79 on rear housing half 16. Thus, when housing halves 14 and 16 are assembled, due to engagement of surfaces 77 and 79, stator element 28 and guide ring 90 will be secured against movement in the axial direction.

Guide ring 90 has a series of holes 107 therein, which may be four in number, for example. Holes 107 provide for communication of fluid from flow path 88 to chamber 104, chamber 104 being connected to a fluid return port (not illustrated). Chamber 104 thus returns fluid from the converter for cooling purposes. Chamber 106 is connected to an inlet port (not illustrated) and acts as a supply chamber for fluid that has been cooled and is returned under pressure. The converter 10 provides the pressure to circulate the fluid. Chamber 106 supplies fluid to an internal port 108 which supplies fluid to an internal annular chamber 110 from which the fluid will flow through a gap 112 between housing 14 and drive flange 74. A portion of this flow will also be conducted through a radial passage 114 in input shaft 18 to provide fluid for lubrication of the parts associated with input shaft 18 and output shaft 20.

Referring to FIG. 2, steel hub 46 for turbine 26 is more particularly illustrated. Hub 46 comprises an annular body portion 140 having two annular series of teeth 142 and 144 thereon. Teeth 142 and 144 are separated by a groove 146. Body 140 has a central bore 148 in which are formed the driving splines 48. As will be apparent to those of ordinary skill in the art, when the cast aluminum turbine member is cast around steel hub 46 to provide a unique turbine member assembly having a steel driving portion and aluminum bladed portion, the aluminum will flow into groove 146 and into the areas between the series of teeth 142 and 144. In addition, the aluminum will flow into the shoulder area 152. As will be readily understood by means of the groove 146 and area 152, there is an axial force translating or driving relationship between the aluminum cast flange 36 and the steel hub 140. In addition, due to the use of the series of teeth 142, and 144, a driving relationship is established between the flange 36 and the steel hub 140 in the rotary direction. Thus, the completed turbine assembly 26 acts as a unitary part and has the advantage of having the relatively lightweight easy to manufacture cast aluminum flange and the central steel portion 46 to provide wear resistance and strength in the area of splines 48.

From the above, it will be understood the present invention provides a unique and novel hydraulic torque converter structure. A unique method is provided for securing the stator in position in the stationary housing through the use of dowel pins 86 extending between the housing and stator 28. In addition, a unique means of defining a flow path between the exit from the stator blades and the entrance to the impeller blades is provided in that an annular guide ring 90 is assembled in the stationary housing portion and secured therein by the use of a simple roll pin 94. At the same time, the assembly of the guide ring 90 is made, proper fluid sealing is carried out by an "O" ring 102 engaging the ring 90 to define entrance and exit fluid chambers for the hydraulic torque converter 10.

In addition, a turbine element is provided which is both easy to manufacture and has the qualities required of being lightweight in the bladed area due to the aluminum material and a hardened and strengthened hub area due to the use of a unique steel hub construction. In addition, the assembly of the turbine 26, utilizing the shape of hub 46 providing driving relationships through teeth in a rotary direction and through a groove between the teeth in an axial direction provides a structure between the aluminum and steel portions which will retain the unitary construction throughout the life of the torque converter. Further, a one-way clutch is provided between output shaft 20 driven by turbine 26, by means of a hollow end portion on output shaft 20 and having mounted centrally thereof; the stub shaft 35 such that the turbine cannot overspeed the impeller and input shaft at any time. The unique torque converter assembly provides for an efficient fluid flow path as defined by guide ring 90 resulting in a high torque ratio between the impeller and turbine elements.

Various features of the invention have been particularly shown and described; however, it should be obvious to one skilled in the art that modifications may be made therein without departing from the scope of the invention as set forth by the following claims.

I claim:

1. A hydrodynamic device comprising a fixed housing carrying a vaned stator element and vaned turbine and impeller elements cooperating with said housing and stator element to define a toroidal chamber for fluid flow therethrough, fluid flow through said turbine and impeller being at generally right angles to the axis of rotation of the device, fluid flow through said stator being in a direction parallel to the axis of rotation, an annular sheet metal guide mounted in said fixed housing and partly defining a fluid flow path between said stator and said impeller said guide having an outer edge surface, and pin means engaging said surface and said housing and retaining said guide in said housing.

2. A device as in claim 1 wherein said guide engages the housing on an inner annular surface and at a midpoint in the radial extent of said guide.

3. A device as in claim 2 wherein seal means are provided in said housing engaged by said guide whereby a fluid exit chamber and a fluid entrance chamber for said converter are defined between said housing and said guide ring.

4. A device as in claim 3 wherein said guide ring has means therein communicating said exit chamber with the fluid flow path in said converter.

5. A device as in claim 2 wherein said pin means comprises a roll pin.

6. A hydrodynamic device comprising a fixed housing carrying a vaned stator element and vaned turbine and impeller elements cooperating with said housing and stator element to define a toroidal chamber for fluid flow therethrough, fluid flow through said turbine and impeller being at generally right angles to the axis of rotation of the device, fluid flow through said stator being in a direction parallel to the axis of rotation, said stator element being mounted in said fixed housing, a hole being formed in said stator at an outer annular edge and in said housing, locking means in said hole restraining said stator element in a rotational sense with respect to said housing.

7. A device as in claim 6 wherein said locking means comprises a dowel pin driven in said hole.

8. A device as in claim 6 wherein an annular guide means defining a flow path is provided in said housing and is engaged by said stator, said housing being comprised of front and rear fixed housing halves secured together whereby when said housing halves are secured together said stator and guide means will be secured in an axial direction.

9. A hydrodynamic device comprising a fixed housing carrying a vaned stator element and vaned turbine and impeller elements cooperating with said housing and stator element to define a toroidal chamber for fluid flow therethrough, fluid flow through said turbine and impeller being at generally right angles to the axis of rotation of the device, fluid flow through said stator being in a direction parallel to the axis of rotation, an annular sheet metal guide mounted in said fixed housing and partly defining a fluid flow path between said stator and said impeller said guide having an outer edge surface, means engaging said surface and said housing and retaining said guide in said housing, said stator element being fixed in said housing by providing a hole formed in said housing and said stator at the outer annular edge of the stator, locking means in said hole to restrain said stator in a rotational sense with respect to said housing, and said stator engaging said guide ring.

10. A device as in claim 9 wherein said guide engages the housing on an inner annular surface and at a midpoint in the radial extent of said guide.

11. A device as in claim 10 wherein seal means are provided in said housing engaged by said guide whereby a fluid exit chamber and a fluid entrance chamber for said converter are defined between said housing and said guide ring.

12. A device as in claim 11 wherein said guide ring has means therein communicating said exit chamber with the fluid flow path in said converter.

13. A device as in claim 9 wherein said housing is comprised of front and rear fixed housing halves secured together and said stator being engaged by said rear housing half whereby said stator and guide are secured axially in said converter.

14. A device as in claim 13 wherein said engaging means is a roll pin and said locking means comprising at least one dowel pin.

15. A rotary bladed element for a hydraulic torque converter including an inner hub made of high-strength and wear resistant material and the remainder of the element being of cast material cast around said hub, said hub including two rows of annular teeth with an annular groove therebetween whereby said annular teeth provide an intimate force translating relationship between said hub and the cast material in a rotational sense, and said annular groove providing an intimate force transmitting relationship in an axial sense between said hub and the cast material.

16. A bladed element as in claim 15 wherein said hub is steel and said cast material is aluminum.

* * * * *